July 7, 1970  J. H. BALDWIN ET AL  3,519,111
MANUAL SELECTOR ARRANGEMENT FOR AN AUTOMATIC GEAR BOX
Filed Nov. 30, 1967  4 Sheets-Sheet 4

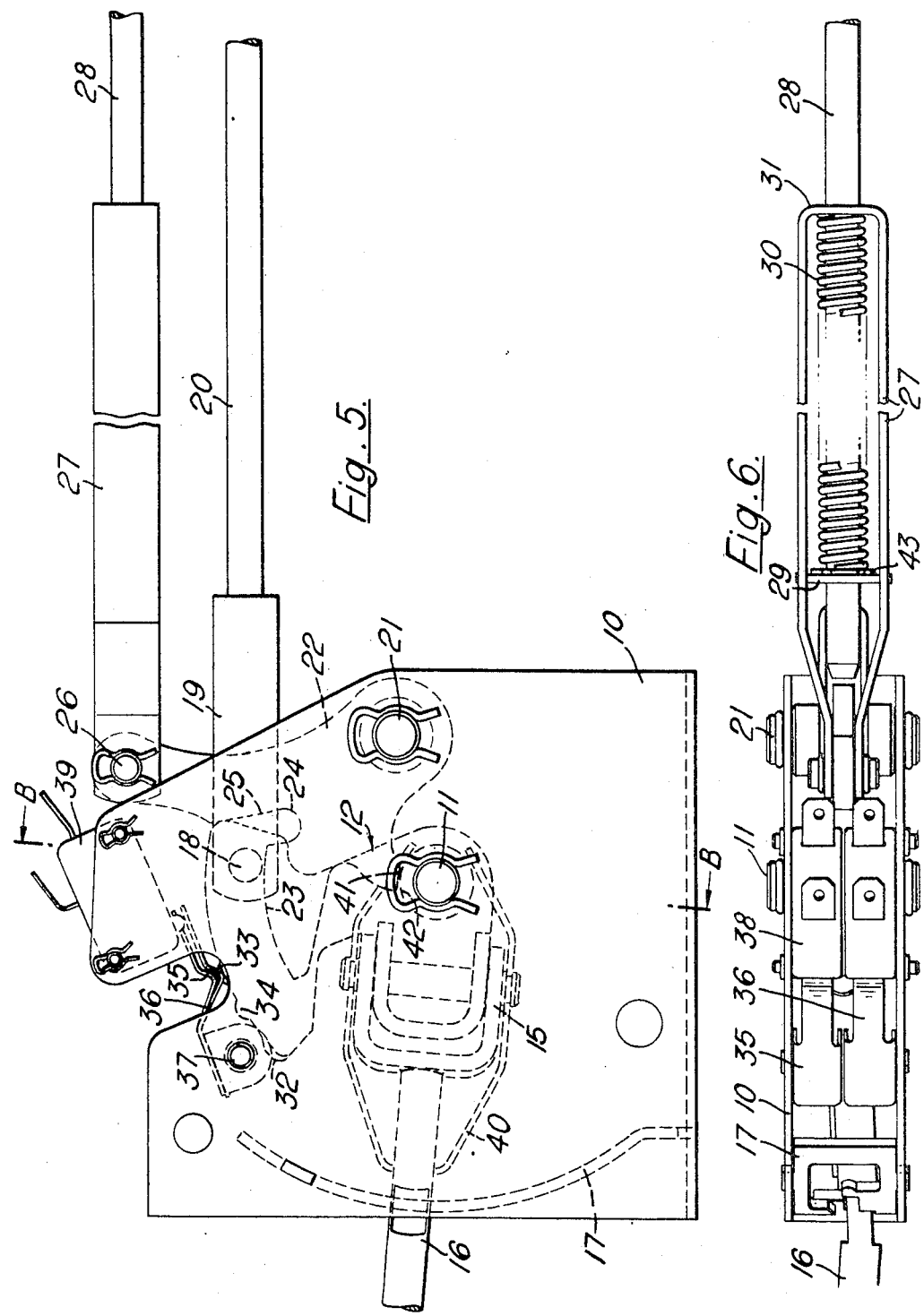

Inventors
JOHN HENRY BALDWIN
EARL WESLEY HANZI
By
ROBERT I. ZIEG
Attorney

United States Patent Office 3,519,111
Patented July 7, 1970

3,519,111
MANUAL SELECTOR ARRANGEMENT FOR AN AUTOMATIC GEAR BOX
John Henry Baldwin and Carl Wesley Hanzi, Letchworth, England, assignors to Borg-Warner Limited, Letchworth, England, a British company
Filed Nov. 30, 1967, Ser. No. 686,870
Int. Cl. F16d 65/30, 71/02
U.S. Cl. 192—4       5 Claims

ABSTRACT OF THE DISCLOSURE

A manual selector for an automatic gear box, having the selector valve and parking pawl operated by separate cables, in which the selector lever moves a selector valve cable actuating member the latter being connected to a parking pawl cable actuating member by a lost motion connection, whereby operation of the selector lever from "park" to "reverse" disengages the parking pawl, subsequent movement of the selector lever maintaining the parking pawl disengaged, the lost motion connection allowing the selector actuating member to move to give the various drive conditions.

---

The present invention relates to a manual selector arrangement for an automatic gear box for a motor vehicle.

It is conventional for motor vehicles, which are provided with an automatic gear box, to have a manual selector or control arm positioned within the vehicle for operation by the driver. This arm is movable between a neutral position and one or more forward drive positions, and may also be moved to a reverse drive position and to a park position. In the park position the output shaft of the automatic gear box is locked, by means of a pawl or sprag, to the gear box casing so that the output shaft is prevented from rotating. The locking of the output shaft prevents rotation of the drive wheels of the motor vehicle and movement of the vehicle, when the manual control arm is in the park position. It has been traditional to provide the control arm with a substantially straight gate, in which the positions include in series "park—reverse—neutral—and one or more forward drive positions." This form of straight gate has now become the accepted form and in some countries, including the United States, it has become a safety requirement to provide such a gate.

In one particular form of automatic gear box, the manual selector valve for operating the transmission and the parking pawl or sprag are actuated by separate cables. This is in contradistinction to the majority of transmissions in which the valve body and parking mechanism are interconnected.

According to the present invention there is provided a manual selector arrangement for an automatic gear box, having the manual selector valve for the gear box, and park pawl actuated by separate cables, such arrangement including a manually operated selector member, a selector actuating member which is adapted to be connected to the selector cable, and a parking pawl actuating member connected to said selector actuating member by a lost motion connection, the arrangement being such that operation of the manually operated selector member, from the park to the reverse position of the gate, moves the parking pawl actuating member to a position to disengage said pawl, and subsequent movement of said lever to the other positions of said gate maintains said parking pawl actuating member in this position, and yet allows the selector actuating member to move the selector cable to the various drive conditions.

In a preferred construction the manually operated selector member is pivoted to the frame of the selector arrangement and is connected to the selector actuating member, so that the latter pivots with it.

With this arrangement the selector actuating member may be provided with a pin, which engages the parking pawl actuating member, which again is pivoted to the frame of the selector arrangement. The pin may abut a surface to move the parking pawl selector member to the parking pawl "in" position. With this arrangement, if the parking pawl actuating member and the selector actuating member are pivoted about separate axes, the pin on the selector actuating member may engage in a recess in the parking pawl actuating member, so that, on return of the manually operated selector lever from the park to the reverse position, the parking pawl actuating member is pivoted to the parking pawl "out" position. Preferably, the parking pawl actuating member is provided with a cam surface which is engaged by the pin on the selector actuating member, to hold the parking pawl actuating member in the parking pawl "out" position, as the selector actuating member is moved to the neutral and forward drive positions of the gate.

Desirably, the selector actuating member is provided with three micro-switch actuating surfaces, Two of these micro-switch actuating surfaces serve to operate a micro-switch, to energise the starter operating circuit of the vehicle, only when the manually operated selector member is positioned in the "park" or "neutral" position. The other micro-switch actuating surface operates a micro-switch to energise the reversing light of the vehicle, when the manually operated selector member is in the "reverse" position.

In a preferred construction, the parking pawl actuating member is connected to the parking pawl cable by means of a resilient connection. Thus the parking pawl actuating member may move to the parking pawl "out" position, even if the parking pawl itself is unable to be taken out of engagement, because of a severe load imposed upon it by the vehicle. As soon as the vehicle engages a forward or reverse drive condition of the transmission, the vehicle will move slightly releasing the parking pawl through the resilient connection. The resilient connection may comprise a rod adapted to be connected to the parking pawl actuating cable, a compression spring surrounding said rod and an element connected to the parking pawl actuating member, acting on the other end of said compression spring, so that movement of the parking pawl actuating member can be effected, with compression of the spring, without actual movement of the parking pawl actuating cable.

In order that the invention may more readily be understood, the following description is given, merely by way of example, reference being made to the accompanying drawings, in which:

FIG. 5 is a side elevation of an actual embodiment of selector arrangement according to the invention;

FIG. 6 is a top plan view of the arrangement of FIG. 5;

Figure 1:
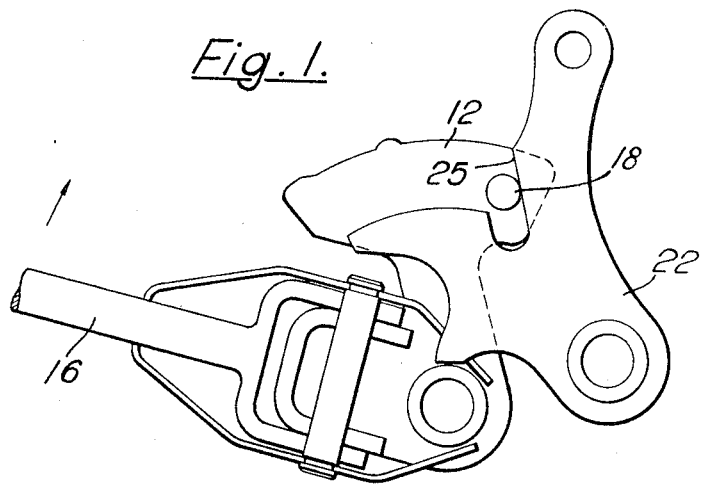
FIG. 1 is a schematic view of an arrangement according to the present invention showing the manually operated member being moved from the "reverse" to the "park" position.
Figure 2:
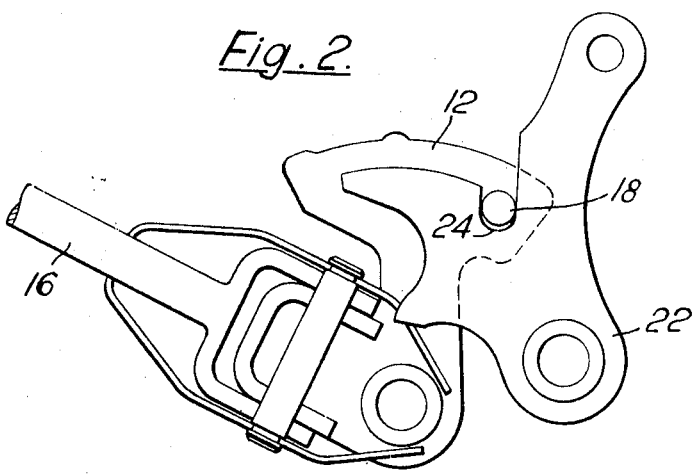
FIG. 2 is a view similar to FIG. 1 illustrating the manually operated member in the "park" position.

Referring more particularly to FIGS. 5 to 8, there is illustrated an arrangement comprising a frame 10 of generally channel section formation, the sides of the frame being spanned by a horizontal pivot pin 11, on which is mounted a selector control member 12 comprising two spaced apart vertical plates 13 and 14. Connected to these plates 13, 14, by a clevis connection 15, is a manually operated control lever 16, which passes through an arcuate slotted gating plate 17, spanning the channel section frame 10.

A pin 18 spans the two plates 13 and 14 of the actuating member 12, and serves to support the bifurcated end 19 of a selector control cable rod 20.

A further pivot pin 21 extends between the sides of the channel sectioned frame 10 and is spaced from the pivot pin 11, and serves to support a parking pawl actuating member 22, located between the two plates 13 and 14 of the selector actuating member 12. The member 22 is provided with a cam surface 23 which just clears the pin 18 in the N, D and L positions (i.e. the neutral, normal forward drive and low speed forward drive positions) of the control member 16. The cam surface 23 terminates in a recess 24 having, thereabove, an abutment surface 25. At the upper end of the member 22, a pin 26 serves to pivot a double arm 27 which has slidably mounted therein a parking pawl actuating rod 28. There is an abutment plate 29 between the two halves of the arm 27, a circlip 43, locating compression spring 30 on rod 28, abutting this plate. The other end of the spring 30 abuts against the end portions 31 of the arm 27.

The plate 13 has on its upper surface two cam pips 32 and 33, while the plate 14 has a further cam pip 34 between the pips 32 and 33. The pips 32 and 33 cause the raising of a resilient feeler arm 35 while the pip 34 causes raising of a similar feeler arm 36, the two feeler arms being mounted for pivoting on a pin 37 between the sides of the frame 10. Also mounted between the sides of the frame are two micro-switches 38, 39, the micro-switch 38 being actuated by the arm 35 and the micro-switch 39 being actuated by the arm 36. The micro-switch 38 serves as a start inhibitor switch, which prevents operation of the starter of the vehicle except when the arm 35 is raised by the pips 32 or 33, while the micro-switch 39 causes switching on of the reversing light of the vehicle, when the arm 36 is raised by the pip 34.

Figure 8:
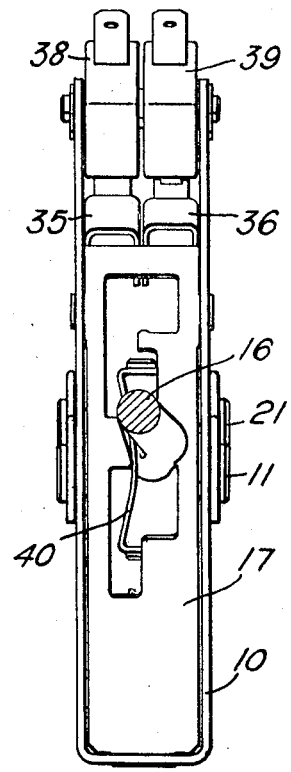
FIG. 8 is an end elevation of the arrangement of FIG. 5.

A spring 40 mounted on the clevis 15 is biased to urge the manual control lever 16 to the right as viewed in FIG. 8. This serves to restrain the manual lever 16 in a particular position in the slot of the gating plate 17, unless the lever is actually being moved by hand.

The operation of the above described arrangement will be described with particular reference to FIGS. 1 to 4 of the accompanying drawings. In FIG. 1 the lever 16 is illustrated in the reverse drive condition. As one moves the lever in a clockwise direction, the pin 18, mounted on the member 12, abuts the surface 25 on the member 22. As the lever 16 is moved to the "park" position illustrated in FIG. 2, the member 22 is pivoted to the position indicated in FIG. 2 in which the pin 18 engages in the recess 24. In this position the parking pawl control rod 27 is moved to the right (FIG. 5) and the parking pawl is engaged, to hold the transmission output shaft in a locked condition.

Figure 3:
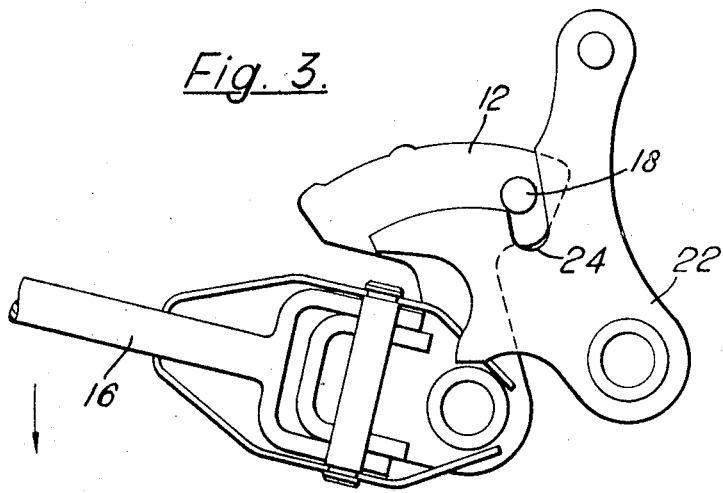
FIG. 3 is a view similar to FIG. 1 showing the manually operated lever moving from the "reverse" to "forward drive" position.

If one then moves the manual lever 16 back to the reverse drive condition illustrated in FIG. 3, the member 12 is pivoted in an anti-clockwise direction. Since the pin 18 is engaged in the recess 24, the member 22 also moves in an anti-clockwise direction bringing with it the double arm member 27. If the parking pawl is under considerable load due to the vehicle being on an excessive incline, then it will not be possible to pull it out directly from the engaged position. If the throttle of the vehicle is now depressed, the load will be taken up by the transmission and the load on the parking pawl will be released. The spring 30 then expands forcibly to remove the parking pawl from the engaged position. With the member 12, and in particular the plate 14 thereof, in the position illustrated in FIG. 3, the pip 34 causes the arm 36 to rise and to actuate the micro-switch 39. This switches on the reversing light of the vehicle.

It will be appreciated that when the manual lever 16 is in the "park" position, the pip 32 raises the arm 35 and operates the micro-switch 38. In this condition, it is possible to operate the starter motor of the vehicle. Similarly, when the lever 16 is moved to the neutral position the pip 33 will raise the arm 35 and operate the micro-switch 38 again allowing the starter motor to be operated. In all other positions of the lever the micro-switch de-energizes the starter motor circuit.

Figure 4:
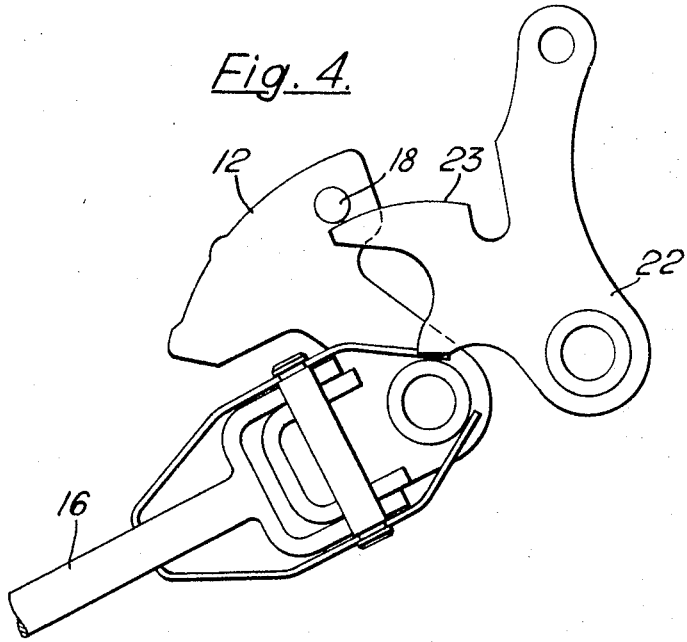
FIG. 4 is a view similar to FIG. 1 illustrating the manually operated member in the "low forward drive" position.
Figure 7:
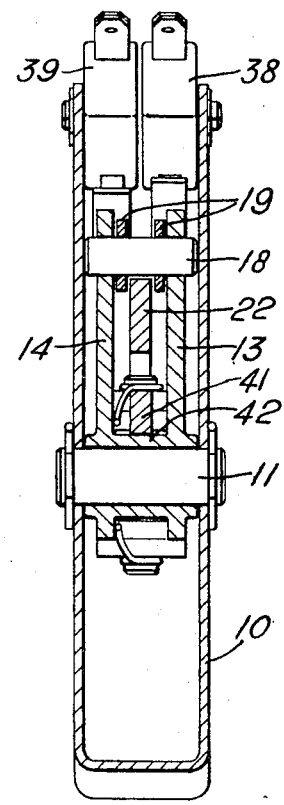
FIG. 7 is a section on the line B—B of FIG. 5.

If the lever is moved from the position illustrated in FIG. 3 to the neutral position, the normal drive position or the low speed forward drive position illustrated in FIG. 4, the pin 18 rides over the cam surface 23 and prevents the member 22 from pivoting in a clockwise direction, so that the parking pawl cannot be engaged. As can be seen in FIGS. 5 and 7, the member 22 is provided with an abutment surface 41 which engages a bushing 42 extending between the plates 13 and 14 of the member 12. This abutment prevents the member 22 from pivoting in an anti-clockwise direction further than illustrated in FIGS. 1, 3, 4 and 5.

Movement of the member 12 causes movement of the selector control rod 20 and of the cable attached thereto, and thus causes operation of the manual selector valve of the transmission, if it is an hydraulically operated transmission, or of any other control member if it is operated in another manner.

We claim:

1. For a vehicle automatic gear box having a manual selector device comprising; a frame for said selector device; a selector lever movable between a park position, a reverse position, a neutral position and a drive position; a selector member connected to said selector lever and pivoted in said frame at a first pivot point; a pin attached to said selector member; a parking pawl actuator movable between a parking position and a released position; said parking pawl actuator being pivoted about a second pivot point spaced from said first pivot point and including an abutment surface positioned to be in abutting relation with said pin and a recess in said actuator engageable by said pin, said pin having lost motion connection with said abutment surface and with said recess and being effective to move said parking pawl actuator from said released position to said parking position upon movement of said selector lever to said park position and said pin from said abutment surface and into said recess.

2. The combination defined in claim 1 wherein said parking pawl actuator is connected to said gear box by way of a yieldable connection, said yieldable connection comprising a compression spring telescopingly mounted between said parking pawl actuator and a member connecting said parking pawl actuator to said gear box.

3. The combination defined in claim 1, wherein said parking pawl actuator comprises a recess including said abutment surface and into which said pin is moved, said recess being positioned to receive said pin effective to pivot said parking pawl actuator as said selector lever is pivoted from said park position to said reverse position.

4. The combination defined in claim 3, wherein said parking pawl actuator comprises a cam surface, adjacent said recess, effective to cooperate with said pin to hold said parking pawl actuator in said released position when said selector lever is moved in said neutral position, drive position and low position.

5. The combination defined in claim 1, wherein said selector member is provided with a first, second and third micro-switch actuating surface, wherein said selector device further comprises a first micro-switch effective to energise the vehicle starter circuit and a second micro-switch effective to actuate the vehicle reversing light circuit, said first and second micro-switch actuating surfaces cooperating with said first micro-switch to operate the latter, only when said selector lever is in the park position or neutral position, said third micro-switch actuating surface cooperating with said second micro-switch to operate the latter, only when said selector lever is in the reverse position.

References Cited

UNITED STATES PATENTS

| | | | |
|---|---|---|---|
| 1,897,216 | 2/1933 | Schmidt | 74—39 |
| 2,349,297 | 5/1944 | Neracher et al. | 192—4 XR |
| 2,499,276 | 2/1950 | Mullins et al. | 192—4 XR |
| 2,821,275 | 1/1958 | Martin | 192—4 |
| 2,910,156 | 8/1959 | Apple | 192—4 XR |
| 2,926,762 | 3/1960 | Edgley | 192—4 |
| 2,964,135 | 12/1960 | Sand | 192—4 XR |
| 2,975,651 | 3/1961 | Fox et al. | 192—4 XR |
| 3,001,618 | 9/1961 | McCordic et al. | 192—4 |
| 3,107,762 | 10/1963 | Snyder et al. | 192—4 |
| 3,153,943 | 9/1964 | Strauss | 74—850 |
| 3,358,797 | 12/1967 | Walton | 192—4 |

MARTIN P. SCHWADRON, Primary Examiner

LESLIE J. PAYNE, Assistant Examiner

U.S. Cl. X.R.

74—850

UNITED STATES PATENT OFFICE
CERTIFICATE OF CORRECTION

Patent No. 3,519,111                                                          July 7, 1970

John Henry Baldwin et al.

It is certified that error appears in the above identified patent and that said Letters Patent are hereby corrected as shown below:

In the sheets of drawings, sheets 2 to 4, lower right-hand corner, "EARL WESLEY HANZI" each occurrence, should read -- CARL WESLEY HANZI --.

Signed and sealed this 23rd day of February 1971.

(SEAL)
Attest:

Edward M. Fletcher, Jr.                              WILLIAM E. SCHUYLER, JR.
Attesting Officer                                                  Commissioner of Patents